(12) United States Patent
Adusumilli

(10) Patent No.: US 7,386,717 B2
(45) Date of Patent: Jun. 10, 2008

(54) METHOD AND SYSTEM FOR ACCELERATING THE CONVERSION PROCESS BETWEEN ENCRYPTION SCHEMES

(75) Inventor: Koteshwerrao Adusumilli, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 10/094,350

(22) Filed: Mar. 7, 2002

(65) Prior Publication Data

US 2003/0172303 A1    Sep. 11, 2003

(51) Int. Cl.
*H04L 9/00* (2006.01)
*G06F 12/04* (2006.01)

(52) U.S. Cl. .................... 713/153; 713/192
(58) Field of Classification Search .............. 380/37; 713/153, 192
See application file for complete search history.

(56) References Cited

U.S. PATENT DOCUMENTS

| | | | | |
|---|---|---|---|---|
| 5,701,343 | A | * | 12/1997 | Takashima et al. ............ 705/51 |
| 5,812,671 | A | * | 9/1998 | Ross, Jr. ..................... 713/153 |
| 5,825,878 | A | * | 10/1998 | Takahashi et al. ............ 713/190 |
| 5,838,165 | A | * | 11/1998 | Chatter ........................ 326/38 |
| 5,995,628 | A | * | 11/1999 | Kitaj et al. .................. 713/164 |
| 6,199,163 | B1 | * | 3/2001 | Dumas et al. ................ 713/183 |
| 6,240,514 | B1 | * | 5/2001 | Inoue et al. ................. 713/153 |
| 6,356,637 | B1 | * | 3/2002 | Garnett ...................... 380/265 |
| 6,389,533 | B1 | * | 5/2002 | Davis et al. ................ 713/162 |
| 2002/0114453 | A1 | * | 8/2002 | Bartholet et al. ............. 380/44 |
| 2003/0115447 | A1 | * | 6/2003 | Pham et al. ................. 713/153 |

FOREIGN PATENT DOCUMENTS

| | | | |
|---|---|---|---|
| EP | 1 083 722 A2 | | 3/2001 |
| KR | 20010056418 | | 7/2001 |
| WO | WO 0201368 | * | 6/2001 |
| WO | WO 02/15523 A1 | | 2/2002 |
| WO | WO 03/036913 A2 | | 5/2003 |

OTHER PUBLICATIONS

Zrobok (Dan Zrobok, http://www.cas.mcmaster.ca/~wmfarmer/SE-4C03-01/papers/Zrobok-WAP.html).*
Schneier (Bruce Schneier, "Applied Cryptography, Protocols, Algorithms and Source Code in C", 2nd edition, 1996 ISBN: 0471128457).*
Jormalainen (Sami Jormalainen "Security in the WTLS", 1999, http://www.tml.tkk.fi/Opinnot/Tik-110.501/1999/papers/wtls/wtls.html) in view of Kitaj et al. (U.S. Patent No. 5995628).*

(Continued)

*Primary Examiner*—Kambiz Zand
*Assistant Examiner*—Peter Poltorak
(74) *Attorney, Agent, or Firm*—Blakely, Sokoloff, Taylor & Zafman LLP

(57) ABSTRACT

A method and system is provided for accelerating the conversion process between encryption schemes. The system includes a board in a gateway. The board includes a controller to receive security parameters and data encrypted according to a first encryption scheme and control the transmission of the data. The system includes a hardware device coupled to the controller to decrypt the data and encrypt the data according to a second encryption scheme. The data is then transmitted to the controller to be forwarded out of the gateway.

19 Claims, 4 Drawing Sheets

OTHER PUBLICATIONS

Tamzin C. Jeffs; "Wireless Application Protocol 2.0 Security"; SANS Institute; Nov. 2001; XP-002249401; http://www.sans.org/rr/papers/68/159.pdf.

Eun-Kyeong Kwon et al.; "Integrated Transport Layer Security: End-to-End Security Model Between WTLS and TLS"; 2001 IEEE; Jan. 31, 2001-Feb. 2, 2001, pp. 65-71; XP010534256.

* cited by examiner

METHOD AND SYSTEM FOR ACCELERATING THE CONVERSION PROCESS BETWEEN ENCRYPTION SCHEMES

BACKGROUND OF THE INVENTION

1. Field of the Invention

The invention relates to the field of network security protocol conversion. In particular, the invention relates to the conversion between the Wireless Transport Layer Security and Secure Sockets Layer protocols.

2. Background Information and Description of Related Art

The Wireless Application Protocol (WAP) defines a set of protocols for wireless applications. The Wireless Transport Layer Security (WTLS) is the security layer of the WAP and provides privacy, data integrity, and authentication for WAP services.

WTLS is based on the Transport Layer Security (TLS), a security layer widely used in the Internet, with modifications to accommodate bandwidth, datagram connection, processing power, memory capacity, and cryptography limitations typical in wireless communications.

Secure Sockets Layer (SSL) is a protocol for transmitting private documents via the Internet. Currently, SSL is not directly compatible with WTLS. Hence, it is not possible to convert between WTLS encrypted data and SSL encrypted data without decrypting the data.

The common method of converting between SSL data and WTLS data uses software executing inside a WAP gateway. Wireless messages travel through the air to a carrier's receiver, where they are received and passed to the gateway. If the message is WTLS encrypted, the encrypted message is decrypted, then encrypted using SSL. If the message is SSL encrypted, the encrypted message is decrypted, then encrypted using WTLS. Then, the encrypted message is transmitted out of the gateway.

The data is decrypted and stored in the memory of the WAP gateway temporarily, allowing a period of time when the message is unencrypted and unprotected in the WAP gateway. This creates a security vulnerability. Furthermore, since the conversion is done using software, a considerable amount of CPU resources are consumed and a latency in the response to a client request may be experienced.

BRIEF DESCRIPTION OF DRAWINGS

The invention is illustrated by way of example, and not by way of limitation, in the figures of the accompanying drawings in which like reference numerals refer to similar elements.

DETAILED DESCRIPTION OF THE INVENTION

Embodiments of a system and method for accelerating the conversion process between encryption schemes are described. In the following description, numerous specific details are provided for a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
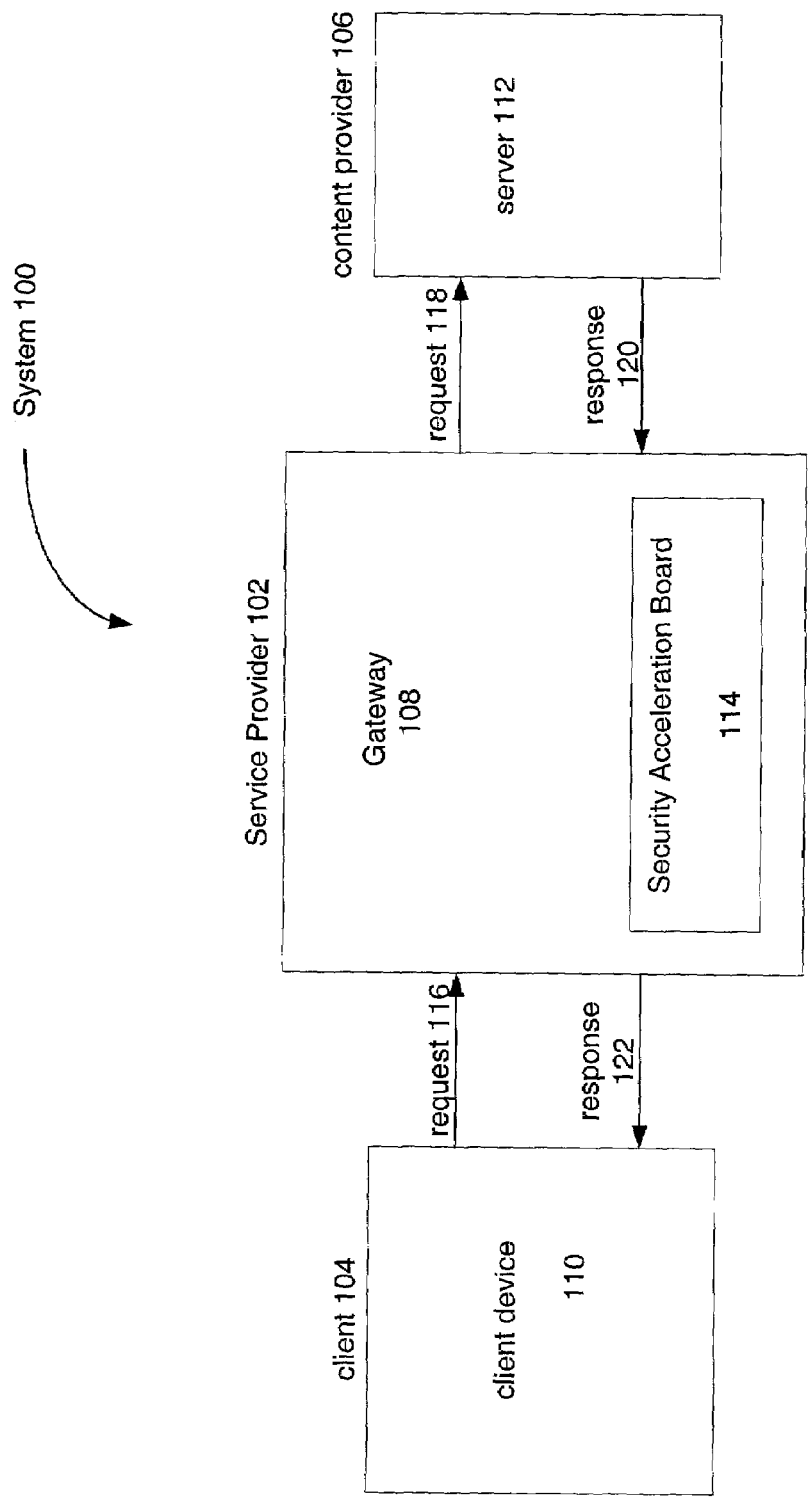
FIG. 1 illustrates an embodiment of a system implementing the invention.

Referring to FIG. 1, a block diagram illustrates an embodiment of a system 100 implementing the invention. Those of ordinary skill in the art will appreciate that the system 100 may include more components than those shown in FIG. 1. However, it is not necessary that all of these generally conventional components be shown in order to disclose an illustrative embodiment for practicing the invention. System 100 includes a service provider 102, a client 104, and a content provider 106. The client has a device 110. In one embodiment of the invention, the device 110 is a wireless device, which typically uses Wireless Application Protocol (WAP), a set of protocols for wireless applications. The content provider 106 has a server 112 to store content. The service provider 102 provides a gateway 108. The gateway 108 connects the client 104 to the content provider 106. The gateway 108 encrypts and decrypts data as necessary to provide compatibility between the different protocols used by the client and the content provider. For example, the client device 110 typically encrypts data according Wireless Transport Layer Security Protocol (WTLS), a security layer for WAP that provides privacy, data integrity, and authentication for WAP services. Data on the Internet is typically encrypted according to Secure Sockets Layer Protocol (SSL). Therefore, the gateway will decrypt and encrypt the data from WTLS to SSL and vice versa if the client wants to access an Internet web page.

The gateway 108 contains a security acceleration board 114 for decrypting and encrypting data. In one embodiment of the invention, the board 114 is a plug and play device that fits into a Peripheral Component Interconnect (PCI) slot or a single or dual in-line memory module (SIMM or DIMM) slot.

The client uses the device 110 to send a request 116, which is encrypted according to an encryption scheme. For example, a client may use a cellular phone to send a request for an Internet web page. The request 116 is received in the gateway 108. The board 114 decrypts the request 116 and encrypts the request according to another encryption scheme. In one embodiment of the invention, the request is encrypted according to WTLS. The board 114 may decrypt the request and encrypt the request according SSL. The request 118 is sent to a content provider 106. The content provider accesses the requested content and sends a response 120, which is encrypted according to an encryption scheme. In one embodiment of the invention, the response is encrypted according to SSL. The response 120 is received in the gateway 108. The board 114 decrypts the response and encrypts the response according to another encryption scheme. In one embodiment of the invention, the board decrypts the response and encrypts the response according to WTLS. Then, the response 122 is sent to the client device 110.

Figure 2:
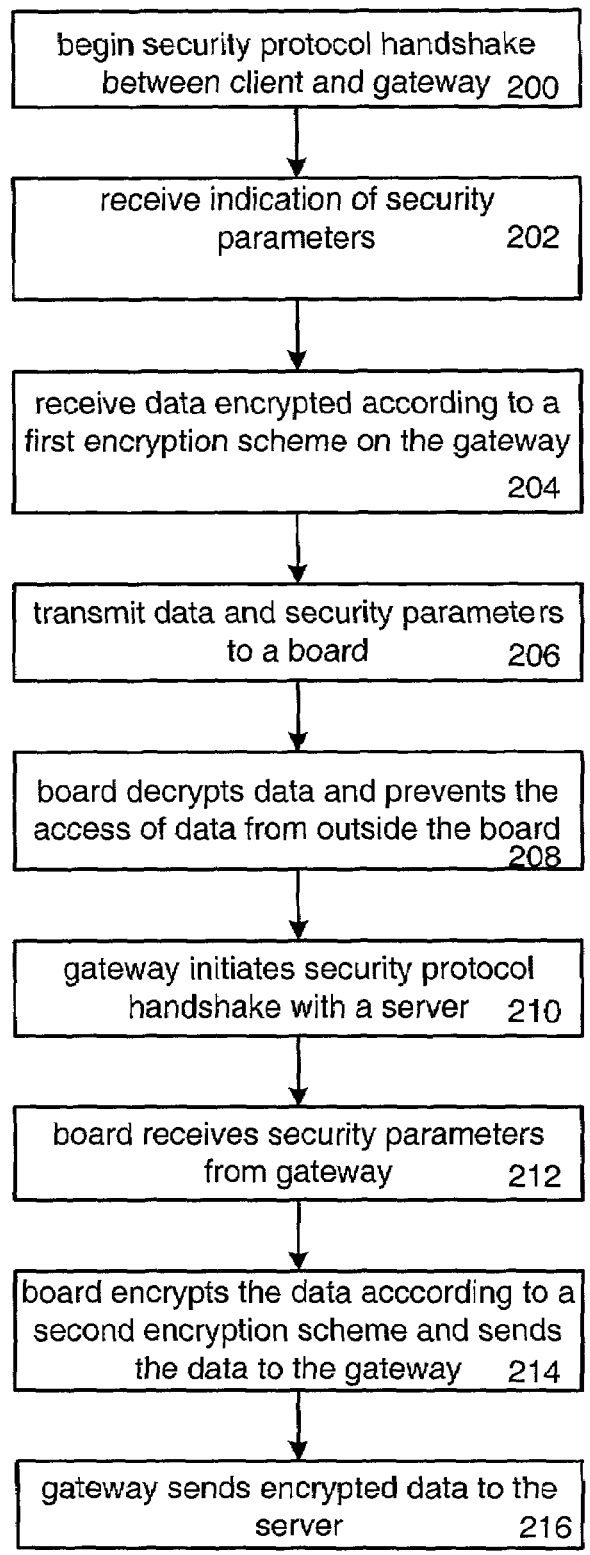
FIG. 2 illustrates an example of a security procedure implemented with an embodiment of the method of the invention.

Referring to FIG. 2, an example of a security procedure implemented with an embodiment of the method of the invention is illustrated. At 200, there is a security protocol handshake between the client and the gateway. Then, at 202, the client provides the gateway with an indication of security parameters, including security protocol and cryptographic parameters. Then, at 204, the gateway receives data encrypted according to a first encryption scheme. Then, at 206, the data and security parameters are transmitted to the board. Then, at 208, the board decrypts the data and prevents access to the data from outside the board. Then, at 210, the gateway initiates a security protocol handshake with a server, and they both agree upon the required security parameters. Then, at 212, the board receives security parameters from the gateway. Then, at 214, the board encrypts the data according to a second encryption scheme and transmits the data to the gateway. Then, at 216, the gateway transmits the encrypted data to the server. A similar security procedure is used when data from the server is received by the gateway and transmitted to the client.

Figure 3:
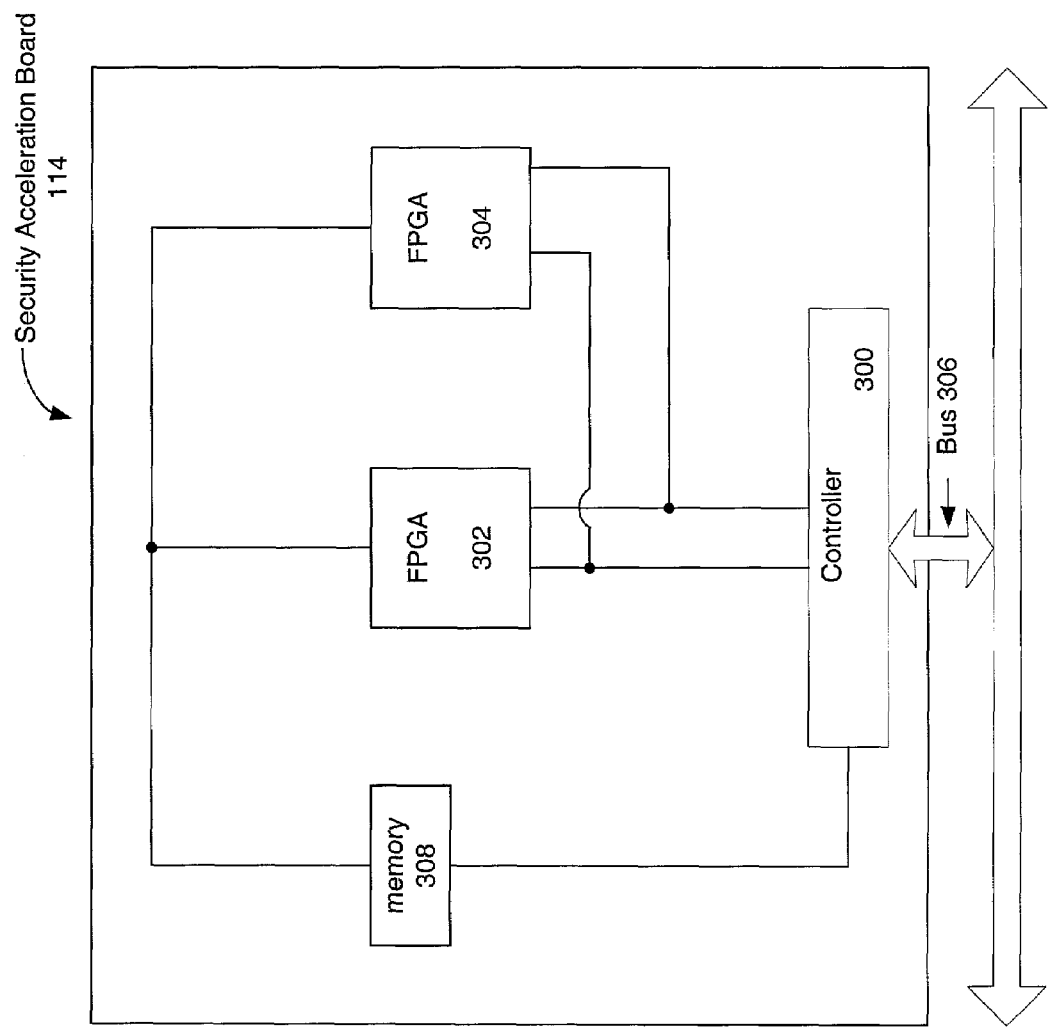
FIG. 3 illustrates an embodiment of a board according to the invention.

FIG. 3 illustrates one embodiment of the security acceleration board 114 of the invention. The board includes a controller 300 and a hardware device 302. The controller receives data and security parameters from a bus 306. In one embodiment of the invention, the controller is a Field Programmable Gate Array (FPGA). The data is encrypted according to an encryption scheme. The controller 300 determines what conversion is needed and then transmits the data to the hardware device 302. In one embodiment of the invention, the hardware device 302 is a programmable hardware device. For example, the hardware device 302 may be a FPGA. In another embodiment of the invention, the hardware device 302 is a non-programmable hardware device. For example, the hardware device 302 may be an Application Specific Integrated Circuit (ASIC). The hardware device 302 decrypts the data received from the controller and encrypts the data according to another encryption scheme.

In one embodiment of the invention, the data is stored in a memory 308 during the conversion process. The controller 300 controls the access of memory 308. In one embodiment, the controller 300 prevents access to the memory from outside the board 114. This prevents the gateway 108 and sources outside the gateway from accessing the memory. In one embodiment of the invention, there may be more than one memory used to store the data during the conversion process. After the data is converted from one encryption scheme to another encryption scheme, the data is transmitted to the controller 300 to forward out of the gateway 108.

In one embodiment of the invention, board 114 includes a second hardware device 304. In this embodiment, the hardware device 302 does the decryption and encryption of data according to one encryption scheme while the second hardware device 304 does the decryption and encryption of data according to another encryption scheme. For example, suppose that the board 114 is used to convert data from WTLS to SSL and from SSL to WTLS. The hardware device 302 may be configured for SSL encryption and decryption while the second hardware device 304 may be configured for WTLS encryption and decryption. Therefore, if the data received at the controller 300 is SSL encrypted, the controller will transmit the data to hardware device 302 to decrypt the data. Then, hardware device 302 will transmit the data to the second hardware device 304 to encrypt the data according to WTLS. The data is then transmitted to the controller for forwarding out of the gateway. Conversely, if the data received at the controller is WTLS encrypted, the controller will transmit the data to the second hardware device 304 to decrypt the data. Then, the second hardware device 304 will transmit the data to the hardware device 302 to encrypt the data according to SSL.

In one embodiment of the invention, the second hardware device 302 is a programmable hardware device, for example, a FPGA. In another embodiment of the invention, the second hardware device 302 is a non-programmable hardware device, for example, an ASIC.

Figure 4:
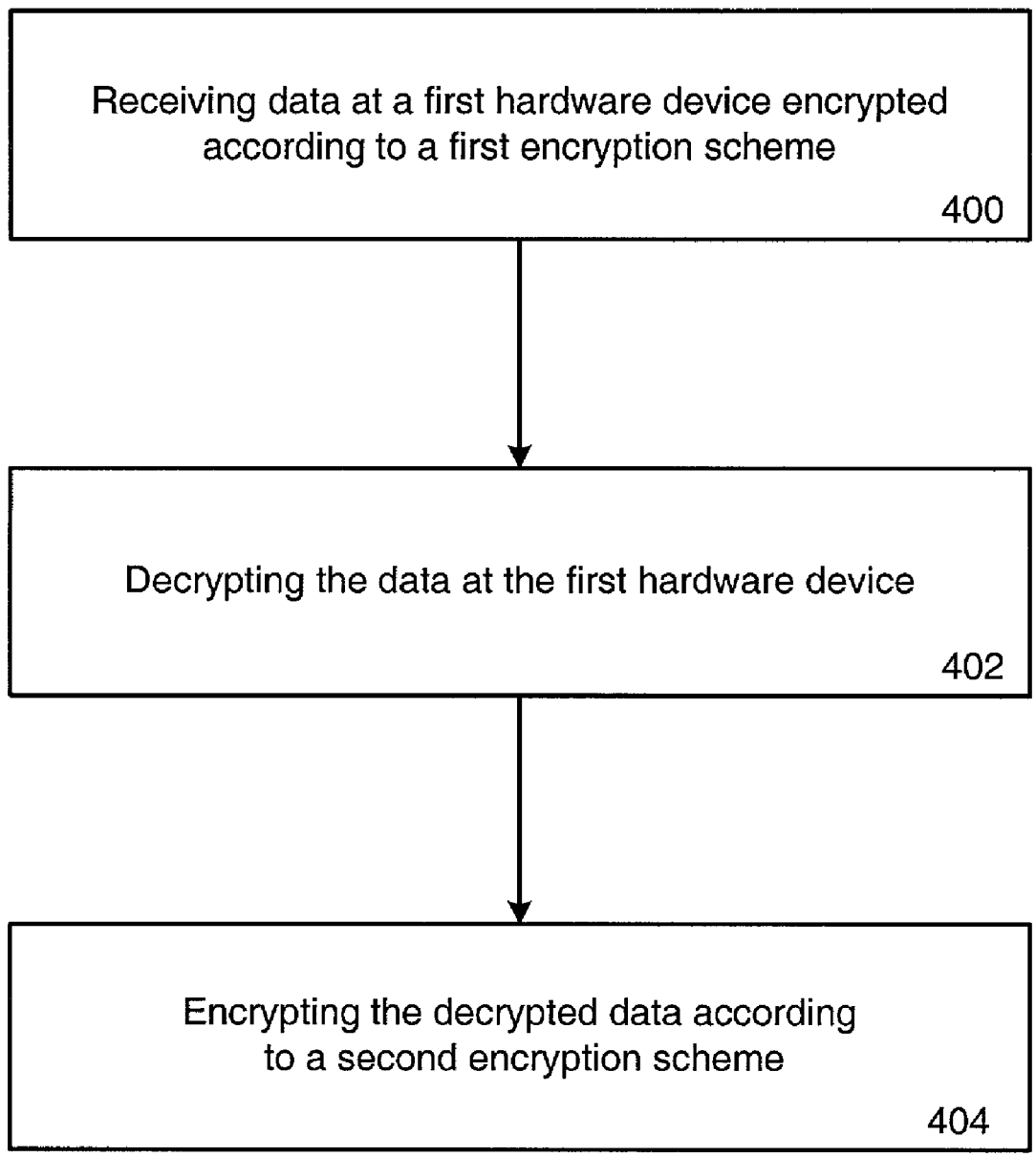
FIG. 4 illustrates an embodiment of the method of the invention.

FIG. 4 illustrates one embodiment of the method of the invention. At 400, data is received at a first hardware device encrypted according to a first encryption scheme. In one embodiment of the invention, the data is received from a controller. In one embodiment of the invention, data and security parameters are received at the first hardware device. Then, at 402, the data is decrypted at the first hardware device. In one embodiment of the invention, the data is then transmitted to a second hardware device. At 404, the data is encrypted according to a second encryption scheme. In one embodiment of the invention, the data is encrypted according to a second encryption scheme at the first hardware device. In another embodiment of the invention, the data is encrypted according to a second encryption scheme at the second hardware device. In one embodiment of the invention, the decrypted data is stored and retrieved during the conversion from the first encryption scheme to the second encryption scheme. The data may be stored in a memory. In one embodiment of the invention, access to the stored decrypted data from outside the board 114 is prevented. This prevents access to the stored decrypted data from the gateway 108 and any source outside the gateway. In one embodiment of the invention, access to the stored decrypted data is prevented by the controller 300. In one embodiment of the invention, the data encrypted according to the second encryption scheme is transmitted to the controller to forward out of a gateway.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising:

a controller included in a security acceleration board in a gateway between a wireless network and a content provider, the controller coupled on a first side to a bus external to the security acceleration board to receive security parameters and data encrypted using a first transport layer security protocol from a first user, the controller to control transmission of the data and the security parameters;

a Field Programmable Gate Array (FPGA) device located on the security acceleration board and coupled to a second side of the controller to receive the data and security parameters from the controller, to convert the data from the first transport layer security protocol to a second transport layer security protocol and to send the converted data to the controller, the controller to receive the converted data from the FPGA and to transmit the converted data to a second user via the bus external to the security acceleration board; and a memory coupled to the FPGA device and the controller, the memory to store the data during conversion from the first transport layer security protocol to the second transport layer security protocol, wherein the controller is coupled to prevent external access to data in the memory by the gateway and the FPGA during conversion of the data from the first transport layer security protocol to the second transport layer security protocol.

2. The apparatus of claim 1, wherein the first transport layer security protocol comprises a Secure Sockets Layer Protocol.

3. The apparatus of claim 1, wherein the first-transport layer security protocol comprises a Wireless Transport Layer Security Protocol.

4. The apparatus of claim 1, wherein the second transport layer security protocol comprises a Wireless Transport Layer Security Protocol (WTLS).

5. The apparatus of claim 1, wherein the second transport layer security protocol comprises a Secure Sockets Layer Protocol.

6. The apparatus of claim 1, wherein controller comprises an FPGA.

7. An apparatus, comprising:
a controller included in a security acceleration board in a gateway between a wireless network and a content provider, the controller coupled on a first side to a bus external to the security acceleration board to receive security parameters and data encrypted using a first transport layer security protocol from a first user, the controller to control transmission of the data and the security parameters;
a first Field Programmable Gate Array (FPGA) located on the security acceleration board and coupled to a second side of the controller to receive the data and security parameters from the controller and to decrypt the data;
a second FPGA coupled to the first FPGA to receive the decrypted data and to encrypt the data using a second transport layer security protocol and to send the converted data to the controller, the controller to receive the converted data from the second FPGA and to transmit the converted data to a second user via the bus external to the security acceleration board; and
a memory coupled to the first and second FPGA's and the controller, the memory to store the data during conversion from the first transport layer security protocol to the second transport layer security protocol, wherein the controller is coupled to prevent external access to data in the memory by the gateway and at least one of the first and second FPGA's during conversion of the data from the first transport layer security protocol to the second transport layer security protocol.

8. The apparatus of claim 7, wherein the first transport layer security protocol comprises a Secure Sockets Layer Protocol.

9. The apparatus of claim 7, wherein the first transport layer security protocol comprises a Wireless Transport Layer Security Protocol.

10. The apparatus of claim 9, wherein the second transport layer security protocol comprises a Secure Sockets Layer Protocol.

11. The apparatus of claim 8, wherein the second transport layer security protocol comprises a Wireless Transport Layer Security Protocol.

12. A method comprising:
receiving encrypted data at a controller, the controller included in a security acceleration board in a gateway between a wireless network and a content provider, the controller coupled on a first side to a bus external to the security acceleration board to receive security parameters and data encrypted using a first transport layer security protocol from a first user, the controller to control transmission of the data and the security parameters;
transmitting the encrypted data from the controller to a Field Programmable Gate Array (FPGA) located on the security acceleration board and coupled to a second side of the controller to receive the data and security parameters from the controller;
decrypting the encrypted data at the FPGA;
storing the decrypted data in a memory; and
re-encrypting the decrypted data using a second transport layer security protocol, wherein the controller is coupled to prevent access to data from the gateway during conversion from the first transport layer security protocol to the second transport layer security protocol;
sending the re-encrypted data to the controller; and
transmitting the re-encrypted data from the controller to a second user via the bus external to the security acceleration board.

13. The method of claim 12, wherein the first transport layer security protocol comprises a Secure Sockets Layer (SSL) Protocol.

14. The method of claim 13, wherein the second transport layer security protocol comprises a Wireless Transport Layer Security (WTLS) protocol.

15. The method of claim 12, wherein the first transport layer security protocol comprises a Wireless Transport Layer Security (WTLS) protocol.

16. The method of claim 15, wherein the second transport layer security protocol comprises a Secure Sockets Layer (SSL) protocol.

17. The method of claim 12, wherein re-encrypting the decrypted data using the second transport layer security protocol comprises re-encrypting the decrypted data at the FPGA using the second transport layer security protocol.

18. The method of claim 12, wherein re-encrypting the decrypted data using the second transport layer security protocol comprises encrypting the decrypted data at a second FPGA using the second transport layer security protocol.

19. The method of claim 12 wherein re-encrypting the decrypted data using the second transport layer security protocol comprises encrypting the decrypted data at an Application Specific Integrated Circuit using the second transport layer security protocol.

* * * * *